United States Patent [19]

De Mesmaeker

[11] 4,249,124
[45] Feb. 3, 1981

[54] METHOD AND APPARATUS FOR MONITORING FAULTS BY MEANS OF A POLYGONAL TRIGGER REGION

[75] Inventor: Ivan De Mesmaeker, Fislisbach, Switzerland

[73] Assignee: BBC Brown, Boveri & Company, Limited, Baden, Switzerland

[21] Appl. No.: 890,794

[22] Filed: Mar. 27, 1978

[30] Foreign Application Priority Data

Apr. 1, 1977 [CH] Switzerland .......................... 4091/77

[51] Int. Cl.³ ....................... H02H 3/38; G01R 31/02
[52] U.S. Cl. ........................................ 324/51; 324/52; 361/80
[58] Field of Search ...................... 324/51, 52; 361/79, 361/80, 85

[56] References Cited

U.S. PATENT DOCUMENTS

| | | | |
|---|---|---|---|
| 3,626,281 | 12/1971 | Souillard | 361/85 X |
| 3,700,919 | 10/1972 | Stich | 361/79 X |
| 3,866,094 | 2/1975 | Bothman et al. | 361/85 X |
| 3,898,530 | 8/1975 | Perez-Cavero | 361/85 |

FOREIGN PATENT DOCUMENTS

| | | |
|---|---|---|
| 1538444 | 10/1969 | Fed. Rep. of Germany . |
| 1538383 | 5/1974 | Fed. Rep. of Germany . |
| 1588532 | 7/1974 | Fed. Rep. of Germany . |
| 1947037 | 1/1976 | Fed. Rep. of Germany . |
| 2203080 | 5/1974 | France . |
| 1096279 | 12/1967 | United Kingdom . |
| 1164542 | 9/1969 | United Kingdom . |
| 1170684 | 11/1969 | United Kingdom . |
| 1301946 | 1/1973 | United Kingdom . |
| 1366946 | 9/1974 | United Kingdom . |
| 1390195 | 4/1975 | United Kingdom . |

OTHER PUBLICATIONS

Tonnes, Martin, "*Elektronisches Distanzrelais*", Brown Boveri Mitteilungen, vol. 53, 1966, pp. 784–790.
Humpage et al., "*Discriminative performance... Under Fault Operating Conditions*", Proc. of the IEE, vol. 115, No. 1, Jan. 1968 pp. 141–152.
Barchetti et al., "*Vechalfen von Distanzrelais... Dreipoligen Kuraschlussen*", Brown Boveri Mitteilungen, vol. 57, 8/9 1970, Nos. 8/9, pp. 343–347.
Inbole et al., "*New Technique for Quadrilateral Distance Relay,*" Proc. IEE, vol. 121, No. 6, June 1974 p. 462–466.
"New Technique for Quadrilateral Distance Relay," Proc. IEE, vol. 121, No. 11, 1974 p. 1421–1422.

*Primary Examiner*—Gerard R. Strecker
*Attorney, Agent, or Firm*—Werner W. Kleeman

[57] ABSTRACT

A method of, and apparatus for, monitoring faults at electrical lines, wherein there are formed a multiplicity of detection signals, and threshold monitoring the phase angle between timewise successive detection signals. According to a first aspect of the invention none of the detection signals has a magnitude equal to the line voltage signal. As a further aspect one of the detection signals can comprise an external signal. A still further feature contemplates that one of the detection signals is a difference signal formed by the line voltage signal and an external signal.

9 Claims, 12 Drawing Figures

METHOD AND APPARATUS FOR MONITORING FAULTS BY MEANS OF A POLYGONAL TRIGGER REGION

BACKGROUND OF THE INVENTION

U.S. patent application Ser. No. 953,637, filed Oct. 23, 1978, and U.S. patent application Ser. No. 953,788 filed Oct. 12, 1978, relate to similar subject matter by the same applicant herein.

The present invention relates to a new and improved method of, and apparatus for, monitoring faults at electrical lines, wherein a trigger or trip signal is formed for each line phase composed of line current and line voltage as a function of the distance between the measuring location and the fault location. Furthermore, the present invention relates to apparatus for the performance of such method employing measuring value-transducers or transformers for line current and line voltage for each phase to be monitored of the network system as well as a fault distance-measuring device for the distance-selective generation of a trigger or trip signal.

One proposal for distance-selective fault monitoring of the aforementioned character is known, for instance, from Brown Boveri Mitteilungen, 1966, Volume 53, pages 784–790, wherein electronic means detect relative phase angles between different voltage signals, partially derived by means of line simulation impedances, and such voltage signals are subjected to threshold monitoring. The trigger or trip curve—e.g. in the imaginary input impedance plane—in this case is circular. On the other hand, a relay trigger or trip curve which can be freely configured, according to the momentary protection requirements, cannot be readily realized, especially where there is used only one measuring system for each monitored phase.

SUMMARY OF THE INVENTION

Hence, it is a primary object of the present invention to provide a new and improved method of, and apparatus for, monitoring faults at electrical lines which is not associated with the aforementioned drawbacks and limitations of the prior art proposals.

Another and more specific object of the present invention aims at providing a new and improved distance-selective fault monitoring, whose trigger or trip curve in an imaginary impedance or voltage plane can be defined with comparatively simple means as a polygon having a randomly selectable arrangement of the sides of the polygon or vertices.

Now in order to implement these and still further objects of the invention, which will become more readily apparent as the description proceeds, the method aspects of the present invention are generally manifested by the features that there are formed a multiplicity of fault detection signals or phasors, and the phase angle between timewise successive fault detection signals is subjected to threshold monitoring. According to a first aspect of the invention none of the detection signals has a magnitude equal to the line voltage signal i.e. none of the detection signals is equal to the inverted line voltage. As a further aspect one of the detection signals can comprise an external signal. A still further feature contemplates that one of the detection signals is a difference signal formed by the line voltage signal and an external signal.

Not only is the invention concerned with the aforementioned method aspects, but also relates to apparatus for the performance thereof. According to the invention there are provided a multiplicity of reference impedances connected with a line current-measuring value transducer or transformer. The voltage drop at a respective reference impedance together with the output of a line voltage-measuring transducer is connected with a difference former, and the output of such difference former is connected with a phase angle-monitoring device.

The contemplated reference impedances, which determine at least certain of the vertices of the trigger or trip curve, can be freely selected, thereby affording the strived for adaptation of the trigger or trip range. Also possibly desired, curved sections or portions of the trip region or curve can be approximated by means of a corresponding number of reference impedances. The impedance-reference voltages employed for the formation of the difference signals can be obtained quite simply by applying to the impedances a current signal corresponding to the line current, and equally there can be formed the difference signal required for the phase monitoring while employing a line approximation signal. The phase angle monitoring then delivers a simple criterion for the location of the fault within or without the boundary limits of the trigger or trip region in accordance with the position of the line voltage vector within or without, as the case may be, such trigger or trip region, because with a position within the trigger or trip region none of the relative phase angles reaches the boundary value of 180°, whereas externally of such regions always one of such angles is greater than 180°. A threshold value comparison thus delivers an unambiguous, distance-selective trigger or trip signal.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
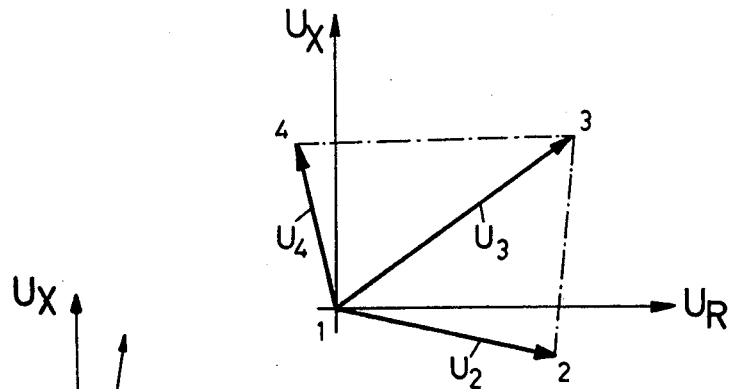
FIG. 1 is a vector diagram of the impedance-reference voltages in the imaginary voltage plane $U_X$–$U_R$ for a quadrilateral trigger or trip region having a vertex or corner point at the coordinate-null point.
Figure 1A:
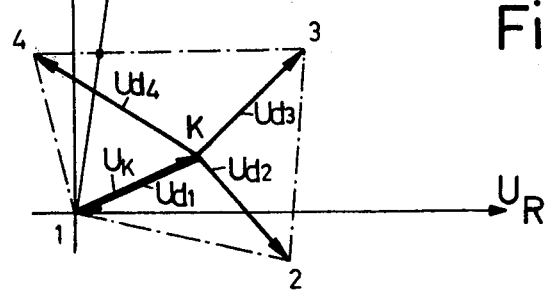
FIG. 1a is a vector diagram of the difference signals with line voltage signal within the trigger or trip range according to FIG. 1.
Figure 1B:
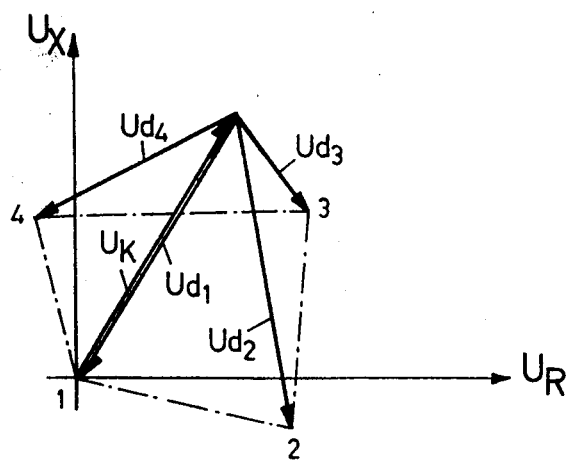
FIG. 1b is a vector diagram according to FIG. 1a, however for a line voltage signal externally of the trigger or trip range.
Figure 2:
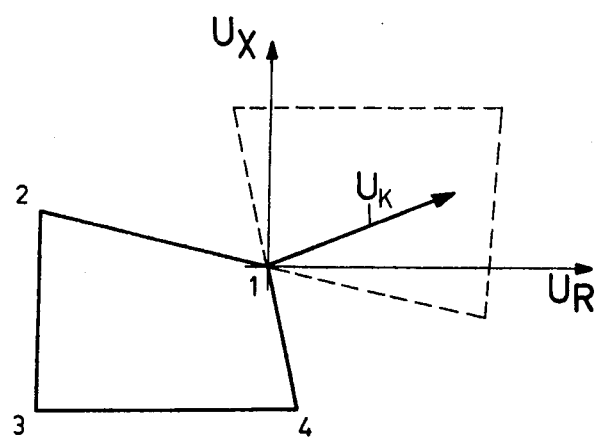
FIG. 2 is a vector diagram showing the relationship during reversal of the current direction in the presence of a fault.

Turning now to the drawings, there will be initially explained on the basis of the vector diagrams of FIGS. 1 to 5 the function of the fault monitoring. In FIG. 1 there is shown a quadrilateral trigger or trip region having the vertices or corner points 1, 2, 3 and 4. The vertices or corner points 2, 3 and 4 are defined by the impedance-reference voltages $U_2$, $U_3$ and $U_4$. According to FIG. 1a there is then formed with the aid of the line voltage signal $U_K$, obtained by the measurement as will be explained more fully later, the difference signals $Ud_2 = U_2 - U_K$, $Ud_3 = U_3 - U_K$ and $Ud_4 = U_4 - U_K$ and additionally a reference signal $Ud_1 = -U_K$, which is incorporated into the monitoring of the relative phase angle between all of the vectors starting from the tip of the vector $U_K$ and thus determines the coordinate-null point in the form of the vertex or corner point 1. For the here assumed position of the vector tip of the vector $U_K$ within the quadrilateral trigger or trip range 1-2-3-4, FIG. 1a clearly shows that none of the relative phase angles between the detection signals or phasors i.e. between the successive difference signals $Ud_2$, $Ud_3$, $Ud_4$ or between the additional reference signal $Ud_1$ and the neighboring difference signals $Ud_2$ and $Ud_4$ has reached the threshold value 180°. This is only first then the case with a position of the vector tip of the vector $U_K$ at the boundary of the trigger or trip region 1-2-3-4. On the other hand, with a position of the vector tip of the vector $U_K$ externally of the trigger or trip region, as shown in FIG. 1b, the relative phase angle between $Ud_3$ and $Ud_4$ is greater than 180°.

In the case of mutually coupled or intermeshed networks, for instance in the case of parallel lines between two busses or bus bars, it is possible, under circumstances, that in the case of a fault with reversal of the current direction i.e. reversal of the direction of flow of the energy or power at a measuring location, there will be simulated a fault location within the boundaries ascribed to the protective device of such measuring location. This is eliminated with the contemplated fault monitoring, as will be explained more fully hereinafter, by formation of the reference voltages determining the vertices as the line current-voltage drop at the reference impedances in a manner apparent from the showing of FIG. 2, because such reference voltages, during reversal of the current direction, shift their phase by 180°, and thus, define the now inversely arranged trigger or trip region 1-2-3-4, within which the vector $U_K$ which is not affected by the reversal of the current direction does not lie. For comparison purposes the trigger region of the original current direction has been shown in broken lines in FIG. 2.

In the case of a fault occurring close-up to the measuring location, the line voltage then collapses almost to null. This corresponds to an equally small value of the vector $U_K$ and renders uncertain triggering or tripping at the region of the coordinate-null point. To counteract this, there can be advantageously resorted to the embodiment of FIG. 3, where a line voltage signal $U_g$, derived from another phase of a multi-phase line system or network or from a number of such other phases by suitable signal mixing or superimposing, is incorporated as a replacement-difference signal or replacement-reference signal—in comparison to FIG. 1a and FIG. 1b e.g. as the replacement for the signal $Ud_1$—directly into the phase angle monitoring. The trigger region 1-2-3-4 thus contains a threshold course which is adequately spaced from the coordinate-null point, because the other phases i.e., the phases differing from the momentarily monitored phase, only are affected in the case of multi-phase faults, and therefore, in many cases deliver a sufficiently high measuring voltage. As concerns multi-phase faults, especially three-phase faults, there can be utilized so-called "remember or sustaining circuits", which approximately continues the course of the line voltage prior to the occurrence of the fault for a certain time, and therefore delivers measuring voltages adequate for the formation of the signal $U_g$. Also such fault monitoring is insensitive to faulty tripping or triggering operations due to reversal of the current direction, as illustrated in FIG. 4, owing to the transition of the trigger or trip region 1-2-3-4 to the trigger region 1-2'-3'-4' by virtue of the phase reversal of the corresponding impedance-reference voltages.

Another possibility for moving the trigger or trip boundary further away from the coordinate-null point contemplates deriving from the line voltage of at least one phase of the line system or network, and which phase differs from the monitored phase, and in a manner as will be explained more fully hereinafter, a voltage signal $U_g$ and to form therefrom together with the line voltage signal $U_K$ of the monitored phase a difference signal $Ud_1$ and to incorporate such into the phase angle monitoring. The thus resultant configuration of the trigger or trip region has been shown in FIG. 5. Here again there is afforded the possibility of continuing the line voltage signal of the non-monitored phases for the formation of the signal $U_g$ in consideration of multi-phase faults.

The phase angle monitoring occurs advantageously with a threshold monitoring of at least approximately 180°. In this way there is obtained an effective boundary of the trigger or trip region, defined by the lines extending between the vertices or corner points 1, 2, 3, 4. Basically, phase angle monitoring also can be carried out with threshold monitoring at threshold values deviating from 180°, especially at larger threshold values. In this way there are formed curved boundary line sections of the trigger region between the vertices, something useful for certain purposes.

Figure 6:
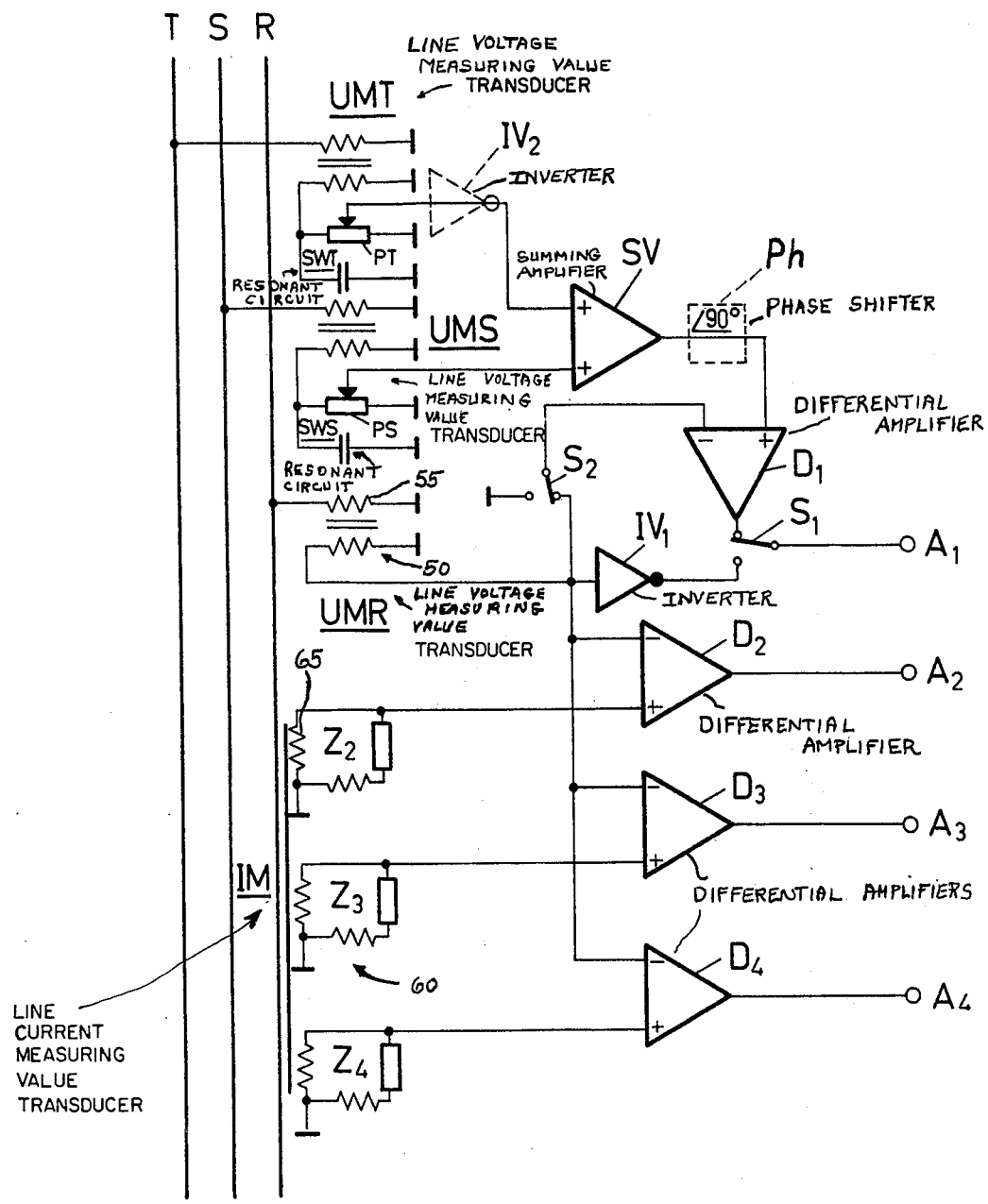
FIG. 6 is a circuit diagram of fault distance-measuring equipment functioning according to the previously enumerated diagrams.
Figure 7:
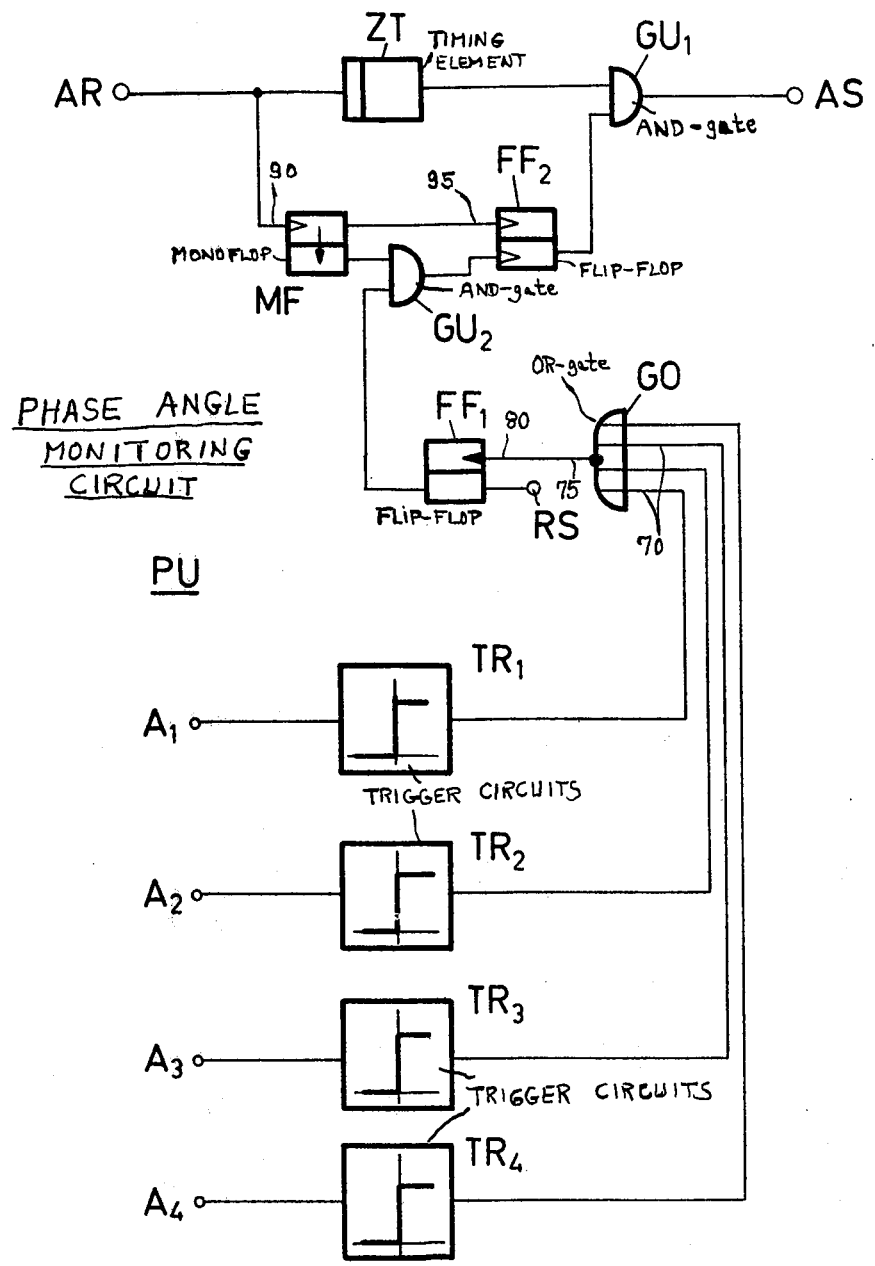
FIG. 7 is a circuit diagram of a phase angle-monitoring device with threshold monitoring for connection with the measuring apparatus shown in FIG. 6.

Now the circuitry shown in FIGS. 6 and 7 for the performance of fault monitoring according to the aforementioned method aspects, will be seen to comprise a line voltage-measuring value transducer or transformer UMR which is connected with the monitored phase R of a three-phase line system or network R, S, T. The line voltage-measuring value transducer UMR comprises a voltage converter 50. There is also provided a line current-measuring value transducer or transformer IM, likewise connected to the phase R, and comprises a current converter, generally indicated by reference character 60, having three secondary windings 65, each of which applies to a related reference impedance $Z_2$, $Z_3$ and $Z_4$, respectively, serving as the load a line current signal. Thus, there appear at these impedances $Z_2$, $Z_3$ and $Z_4$ the previously discussed impedance-reference voltages $U_2$, $U_3$ and $U_4$, respectively, whereas there directly appears at the secondary winding 55 of the line voltage-measuring value transducer UMR the line voltage signal $U_K$. Differential amplifiers $D_2$, $D_3$ and $D_4$ are connected in circuit with the line voltage-measuring value transducer UMR and also with the impedances $Z_2$, $Z_3$ and $Z_4$, respectively, delivering at their outputs $A_2$, $A_3$ and $A_4$ the aforementioned difference signals $Ud_2$, $Ud_3$ and $Ud_4$, respectively. By means of an inverter $IV_1$ and a reversing switch $S_1$, which when located in a switched position opposite to that shown in FIG. 6, the line voltage-measuring value transducer UMR delivers at its output $A_1$ the signal $Ud_1 = -U_K$ i.e. the inverted line voltage signal. Thus there are initially prepared the signals required and which are of interest for the method explained in FIGS. 1, 1a and 1b.

Figure 3:
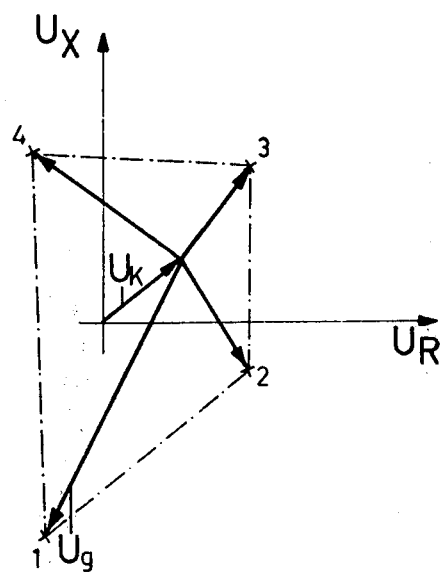
FIG. 3 is a vector diagram incorporating a replacement-difference signal derived from non-monitored phases.
Figure 4:
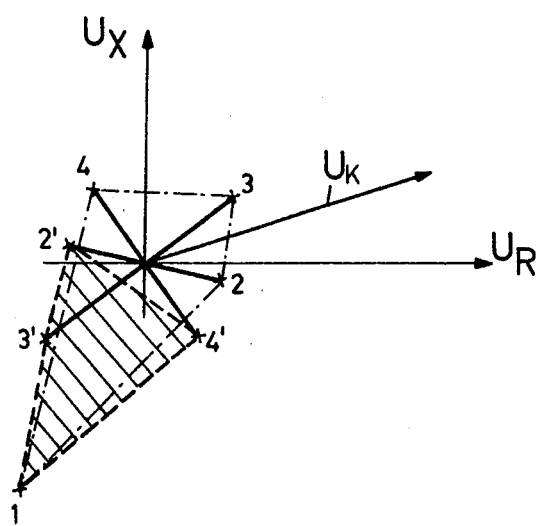
FIG. 4 is a vector diagram according to FIG. 3, however for reversal of the current direction in the presence of a fault or short-circuit.
Figure 5:
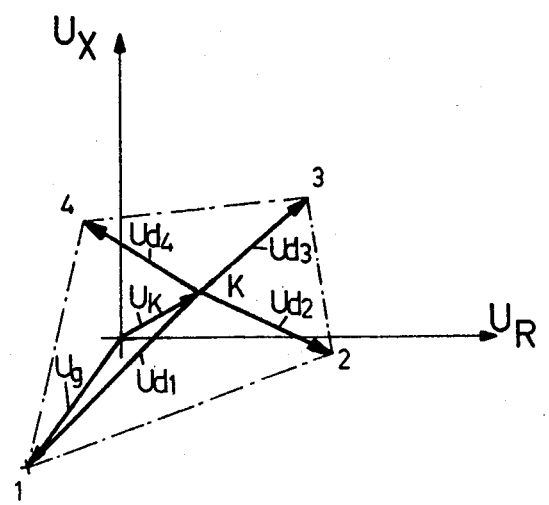
FIG. 5 is a vector diagram with an additional reference voltage derived from non-monitored phases for the formation of a related difference signal by means of the line-voltage signal.

For the modified method aspects of FIG. 3 and FIG. 5 the reversing switch $S_1$ is shifted into the illustrated switch position. The line voltage-measuring value transducers UMS and UMT, which are connected to the non-monitored phases S and T, respectively, of FIG. 6, deliver to the potentiometers PS and PT adjustable voltage signal components $U_S$ and $U_T$. These voltage signal components can be superimposed in a summing amplifier SV to form the voltage signal $U_g = k_1 \cdot U_S + k_2 \cdot U_T$ with the adjustable coefficients $k_1$ and $k_2$ which can be set at the potentiometers PS and PT. By means of a further differential amplifier $D_1$, which with a further reversing switch $S_2$ in the illustrated position, to thus deliver the signal $U_K$ to its subtraction or negative input, there is formed a difference signal $Ud_1 = U_g - U_K$ which appears at the output $A_1$ for introduction into the phase angle monitoring, as explained with reference to FIG. 5. Upon reversing the position of the reversing switch $S_2$ there is dispensed with the subtraction of $U_K$, so that $U_g$ can be directly incorporated into the phase angle monitoring, as previously discussed in conjunction with FIG. 3. By means of a broken line indicated inverter $IV_2$, shown as a modification, it is furthermore possible to form a voltage signal from the signal $U_g$ shifted by a phase shifter Ph through 90° and corresponding to the coupled or linked voltage between the phases S and T. There can be provided resonant circuits SWS and SWT which use the converter-secondary windings as resonant inductances and, as illustrated, appear in the synchronized control connection with the relevant phase voltages (by means of the transformer or converter-primary windings), for sustaining the voltage signals in the case of multi-phase faults.

The phase angle monitoring circuit PU illustrated in FIG. 7 encompasses trigger circuits TR1, TR2, TR3 and TR4 connected with the amplifier outputs A1, A2, A3 and A4, respectively, to form square-wave pulses corresponding to the positive half-waves of the signals $Ud_1$, $Ud_2$, $Ud_3$ and $Ud_4$. All of the square-wave pulses are superimposed by means of an OR-gate GO having four inputs 70, and the output 75 of which only then carries the logic signal "O" when none of the square-wave pulses is present, i.e. when there occurs a gap in the superimposing of the total train of square-wave pulses. In this case a flip-flop $FF_1$, which is reset to its starting state by means of an input RS, is switched such that a subsequently connected AND-gate $GU_2$ is blocked, whereas when there does not occur any gap in the sequence of square-wave pulses such remains in a preparatory state.

At an input AR there is delivered an excitation signal which is produced in the usual fashion during fault detection, and which, as a function of the position of the vector tip of the vector $U_K$ within or without the trigger region, would be switched through to the trigger or trip output AS or be blocked. This selection is accomplished by means of an AND-gate $GU_1$ which is prepared by the input AR by means of a timing element ZT having a slight time-delay. The simultaneously energized or driven monoflop MF having a reset time corresponding to a period of the network voltage, i.e., a period of the repetition frequency of the square-wave pulse train, is connected by means of a further flip-flop $FS_2$ for initially blocking the AND-gate $GU_1$ and switches such in accordance with the reset switching of the monoflop MF only then through to the trip output AS if up to the expiration of the reset or return switching time of the monoflop MF there has not occurred any gap in the superimposed train of square-wave pulses. Moreover, the dynamic input 80 of the flip-flop $FF_1$, which is connected with the OR-gate GO, responds to the negative starting edge of such gap, in contrast to the shown inputs 90 and 95 of the monoflop MF and flip-flop $FF_2$.

Figure 8:
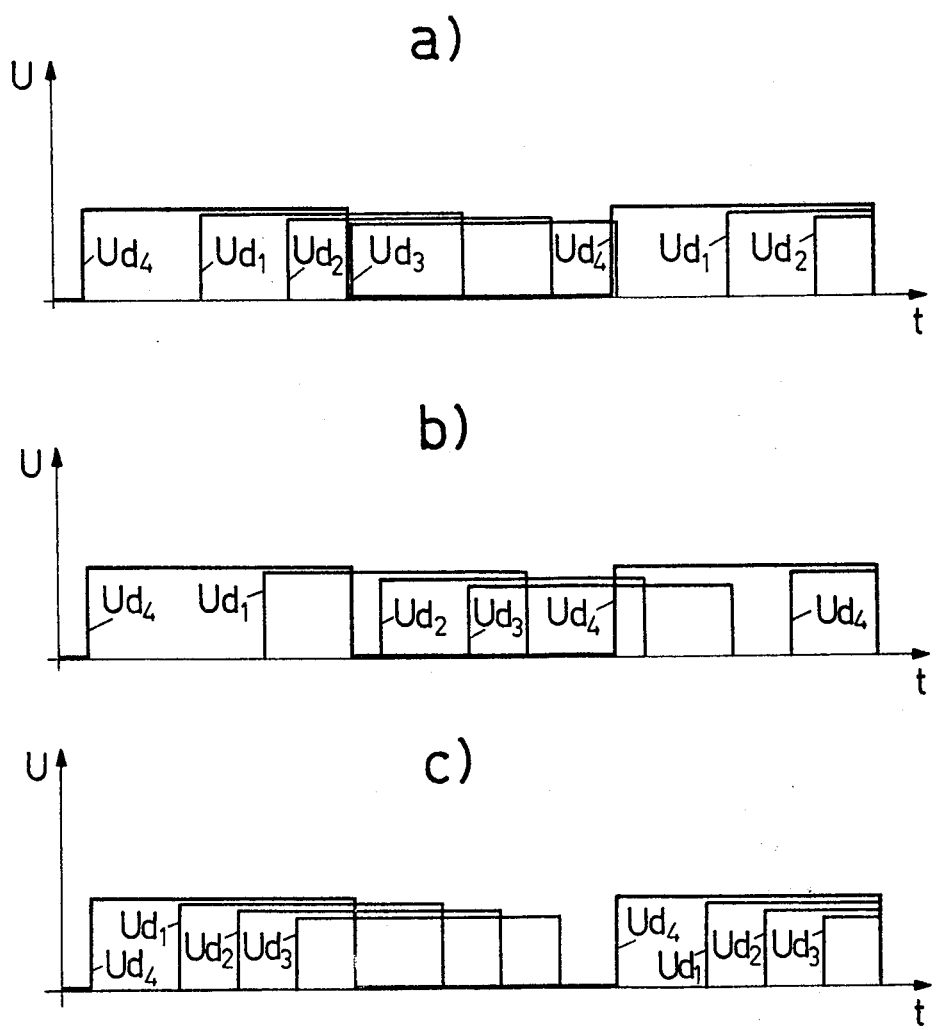
FIG. 8 respectively illustrates signal diagrams as a function of time in FIG. 8(a), FIG. 8(b) and FIG. 8(c) for explaining the function of the circuitry of FIGS. 6 and 7.

Now in FIG. 8(a) there is shown superimposing of the square-wave pulse sequence according to the positive half-waves of the detection signals $Ud_1$ to $Ud_4$ in the case of a phase angle of 180° between the signals $Ud_4$ and $Ud_3$. This is the boundary case for the position of the vector tip of $U_K$ at the boundary line or extremity of the trigger or trip region. The graph of the showing of FIG. 8(b), on the other hand, illustrates superimposing of the square-wave pulse sequence for the case where the position of the signal $U_K$ is within the trigger or trip region, for instance according to the showing of FIG. 1a. Here there does not occur any gap in the superimposed pulse train, because none of the relative phase angles of neighboring signals or square-wave pulses $Ud_1$ to $Ud_4$ has reached 180°. On the other hand, with superimposing of the signals of the square-wave pulse train according to the graph as shown in FIG. 8(c), corresponding to a position of the vector tip $U_K$ outside of the trigger or trip region, there occurs a gap, the negative starting edge of which blocks an excitation signal in the manner explained above in conjunction with the circuitry of FIG. 7, whereas such, in the case of the pulse graphs of FIGS. 8(a) and 8(b), after expiration of a time interval corresponding to a network voltage period, is switched-through for performing a triggering or tripping operation. In this way there is insured for the effectiveness of the phase angle monitoring with the circuitry PU shown in FIG. 7, and equally for the entire distance-selective fault monitoring. Basically, there also can be employed other types of known phase angle monitoring or phase angle detection.

Furthermore, it has been found that each phase of the line system is monitored by a measuring system which is uniform with regard to the temporal function course. In contrast to heretofore known equipment having an effective combination of a number of measuring systems which as a function of time operate in parallel and the fault selection first can be accomplished upon the presence of evaluation or result signals delivered by all of the measuring systems, the monitoring system of the present invention has the notable advantage of greater operational security. In the case of multiple systems with possibly differently rapidly operating partial measuring systems it can happen that in the interval between preparing the different partial results there occurs a change in the operating state of the line system, so that the finally present partial results, which are to be combined with one another, are predicated upon different conditions and under circumstances no longer are compatible with one another.

While there are shown and described present preferred embodiments of the invention, it is to be distinctly understood that the invention is not limited thereto, but may be otherwise variously embodied and practiced within the scope of the following claims. Accordingly,

What I claim is:

1. A method for monitoring an electric line for short-circuits occurring within a predetermined distance from a measuring location at the line, in which line phase detection signals dependent on the distance between the measuring location and the short-circuit location are formed from the line current and the line voltage at the measuring location, and in which timewise immediately successive ones of said detection signals are subjected to a detection and comparison of their relative phase angles with a threshold value of at least approximately 180° to produce a triggering signal in the event of a short-circuit occurring within said predetermined distance, comprising the steps of:
   (a) forming at least three reference signals proportional to the voltage drop across one reference impedance each, said voltage drop being generated by applying a line current signal to the respective reference impedance;
   (b) defining a polygonal triggering region in the impedance plane from said at least three reference signals and their respective reference impedance;
   (c) forming a differential detection signal from each of said reference signals by forming the difference between a corresponding reference signal and a line voltage signal; and
   (d) using at least one external signal as an additional detection signal besides said differential detection signals in said phase angle detection and threshold value comparison in succession, together with said differential detection signals.

2. The method as defined in claim 1, wherein:
the monitored electrical lines define a multi-phase line system;
deriving a voltage signal from at least one phase of the line voltage of the line system which phase differs from the monitored phase to form said external signal.

3. A method for monitoring an electric line for short-circuits occurring within a predetermined distance from a measuring location at the line, in which line phase detection signals dependent on the distance between the measuring location and the short-circuit location are formed from the line current and the line voltage at the measuring location, and in which timewise immediately successive ones of said detection signals are subjected to a detection and comparison of their relative phase angles with a threshold value of at least approximately 180° to produce a triggering signal in the event of a short-circuit occurring within said predetermined distance, comprising the steps of:
   (a) forming at least three reference signals proportional to the voltage drop across one reference impedance each, said voltage drop being generated by applying a line current signal to the respective reference impedance;
   (b) defining a polygonal triggering region in the impedance plane from said at least three reference signals and their respective reference impedance;
   (c) forming a differential detection signal from each of said reference signals by forming the difference between a corresponding reference signal and a line voltage signal;
   (d) forming an additional differential detection signal by subtractively superimposing an external signal and said line voltage signal; and
   (e) including said additional differential detection signal in said detection and threshold value comparison in succession, together with said other differential detection signals.

4. The method as defined in claim 3, wherein:
the monitored electrical lines define a multi-phase line system; and
deriving said external signal from a phase of the multi-phase line system which differs from the monitored phase.

5. An apparatus for monitoring faults at electrical lines, comprising:
a multiplicity of reference impedances;
a line current-measuring value transducer with which there are connected said reference impedances;
at least one line voltage-measuring value transducer having an output;
a respective difference forming circuit connected with the output of a related one of said line voltage-measuring value transducers and a related one of said reference impedances;
the voltage drop across each respective reference impedance together with the output of the related line voltage-measuring value transducer being connected with said respective related difference forming circuit;
each said difference forming circuit having an output carrying a detection signal, wherein none of the detection signals has a magnitude equal to the line voltage signal; and
a phase angle-monitoring device having inputs with which there are connected said outputs of said difference forming circuits.

6. The apparatus as defined in claim 5, wherein:
the phase angle-monitoring device has a further input with which there is connected the output of the line voltage-measuring value transducer.

7. The apparatus as defined in claim 5, wherein:
the electrical lines define a multi-phase line system;
an additional difference forming circuit;
at least one further line voltage-measuring value transducer having an output;
the output of said further line voltage-measuring value transducer being connected with said additional difference forming circuit so that a phase of the line system different from the monitored phase together with an output of the line voltage-measuring value transducer is connected with the monitored phase at said additional difference forming circuit;
said additional difference forming circuit having an output;
said phase angle-monitoring circuit having a further input;
said output of said additional difference forming circuit being connected with said further input of the phase-angle-monitoring device.

8. The apparatus as defined in claim 5, wherein:
the electrical lines define a multi-phase line system;
at least one further line voltage-measuring value transducer having an output;

the output of said further line voltage-measuring value transducer carries a phase difference from the monitored phase of the line system and is connected with an input of the phase angle-monitoring device.

9. The apparatus as defined in claim 7, further including:

a resonant circuit tuned to the fundamental frequency of the line voltage provided for at least one phase of the line system differing from the monitored phase;

said resonant circuit being connected with the related line voltage of said one phase in a synchronized control connection and with its related line voltage-measuring value transducer.

* * * * *